United States Patent [19]

Curby et al.

[11] Patent Number: 4,740,084

[45] Date of Patent: * Apr. 26, 1988

[54] DITHER CONTROLLER FOR RING LASER ANGULAR ROTATION SENSOR

[75] Inventors: Robert D. Curby, Thousand Oaks; George H. McCammon, Simi Valley, both of Calif.

[73] Assignee: Litton Systems, Inc., Beverly Hills, Calif.

[*] Notice: The portion of the term of this patent subsequent to Jul. 1, 2003 has been disclaimed.

[21] Appl. No.: 842,538

[22] Filed: Mar. 21, 1986

Related U.S. Application Data

[63] Continuation of Ser. No. 448,363, Dec. 9, 1982, Pat. No. 4,597,667.

[51] Int. Cl.$^4$ ............................................. G01C 19/64
[52] U.S. Cl. ............................................. 356/350
[58] Field of Search ........................................ 356/350

[56] References Cited

U.S. PATENT DOCUMENTS

| | | | |
|---|---|---|---|
| 2,951,208 | 8/1980 | Barton | 330/273 |
| 3,373,650 | 3/1968 | Killpatrick | 356/350 |
| 3,464,657 | 9/1969 | Bullard | 248/550 |
| 3,467,472 | 9/1969 | Killpatrick | 356/350 |
| 3,555,453 | 1/1971 | Litsauer | 310/321 X |
| 3,714,475 | 1/1973 | Baker, Jr. | 310/321 |
| 3,715,562 | 2/1973 | Dendy et al. | 356/350 X |
| 3,752,586 | 8/1973 | Hutchings et al. | 356/350 |
| 4,085,825 | 4/1978 | Scarborough | 356/350 |
| 4,099,876 | 7/1978 | Dorsman | 310/317 |
| 4,113,387 | 9/1978 | Shutt | 356/350 |
| 4,115,004 | 9/1978 | Hutchings | 331/94 SML |
| 4,132,482 | 1/1979 | Friedland | 356/350 |
| 4,152,072 | 5/1979 | Hutchings et al. | 356/350 |
| 4,243,324 | 1/1981 | Friedland | 356/350 |
| 4,255,054 | 3/1981 | Friedland | 356/350 |
| 4,277,173 | 7/1981 | Ljung et al. | 356/350 |
| 4,309,107 | 1/1982 | McNair et al. | 356/350 |
| 4,314,174 | 2/1982 | Wing et al. | 310/315 |
| 4,321,557 | 3/1982 | McNair | 372/33 |
| 4,425,040 | 1/1984 | Ljung et al. | 356/350 |
| 4,445,779 | 5/1984 | Johnson | 356/350 |

Primary Examiner—Vincent P. McGraw
Attorney, Agent, or Firm—Edmund W. Rusche; Roy L. Brown

[57] ABSTRACT

Apparatus and method for dithering ring laser angular rotation sensors, including a plurality of such sensors with substantially identical natural dither frequencies and having different sensor axes mounted upon a resilient structure; applying energy to dither such sensors; the energy being connected and disconnected from the dithering of each sensor in response to the amplitude of dither of that particular sensor to minimize lock-in; and frequency or phase modulating the energy applied to dithering to avoid continued uni-directional coning effects.

12 Claims, 5 Drawing Sheets

DITHER CONTROLLER FOR RING LASER ANGULAR ROTATION SENSOR

RELATED APPLICATION

This is a continuation of U.S. patent application, Ser. No. 448,363 which was filed Dec. 9, 1982 for DITHER CONTROLLER FOR RING LASER ANGULAR ROTATION SENSOR, now U.S. Pat. No. 4,597,667.

BACKGROUND OF THE INVENTION

A ring laser angular rotation sensor is frequently called a ring laser angular rate sensor or a ring laser gyro. It will be called a ring laser angular rotation sensor herein. It uses a ring laser which is usually, but not necessarily, within a solid block of, for example, quartz or ceramic material. That block, or the equivalent supporting structure for the laser path, will be called and defined herein as the ring laser body.

It must here be noted that early ring laser rotation sensors did not use a solid block for the ring laser but used either a single linear laser in one of the legs or a plurality of linear lasers in the different legs to produce the laser beam. The laser or lasers were attached to a supporting structure along with corner mirrors to complete the ring of light. It is within the contemplation of this invention that ring laser apparatus of that type be included in the concept of a "ring laser body." The ring laser will further be described as if the ring laser path were completely enclosed within a solid block.

A laser body may, for example, be triangular or rectangular, and hollow bores are drilled or otherwise formed within or on the laser body. Mirrors are positioned to cause light to travel from mirror to mirror around a closed path through the bores. The bores typically enclose a lasing gas such as, for example, a helium-neon mixture. To cause the ring laser to become a ring laser angular rotation sensor, means are provided to cause two counter-propagating coherent laser beams to be produced and reflected around the closed path. Partly transparent mirrors are typically used to extract from the ring laser path a portion of the two counter-propagating beams. The two extracted beams are typically directed onto an electrical photo-sensor which is low frequency limited to produce a signal which has a frequency equal to the difference frequency between the two counter-propagating beams. The ring laser angular rotation sensor has a sensor axis inside of the closed ring laser path. When the laser angular rotation sensor is not rotating about its sensor axis, the laser light frequencies of the two counter-propagating laser beams are the same. When the laser angular rotation sensor is rotating about its sensor axis, the frequency of one beam increases and the frequency of the other beam decreases. The difference in frequency between the two counter-propagating beams is a measure of the angular velocity of the angular rotation sensor about its sensor axis. Counting the beats between the two counter-propagating beams provides a measure of the angular displacement of the angular rotation sensor about its sensor axis.

Because of scattering at the mirror surfaces and other factors, the frequencies of the counter-propagating laser beams lock together when the angular velocity of the angular rotation sensor about its sensor axis has a value that is below a particular threshhold. This phenomenon is called, "lock-in". One preferred method of avoiding or minimizing the effects of lock-in is mechanically to oscillate or dither the ring laser angular rotation sensor about its sensor axis.

Still another means for applying an oscillatory bias to the ring laser beams is described in the literature, particularly U.S. Pat. No. 3,373,650 which issued Mar. 19, 1968 to J. E. Killpatrick. In U.S. Pat. No. 3,373,650, a Faraday cell and two quarter-wave plates are inserted into the ring laser light path. The Faraday cell is enclosed in a coil which is energized by an oscillatory current to produce an oscillatory magnetic field that via the Faraday cells changes the phase of each laser beam a different amount thereby biasing the two counter-propagating laser beams with an oscillatory bias.

Although the invention was conceived in connection with laser gryos having mechanical bias, it is intended that the concept, in its broadly claimed form, should encompass the Faraday cell dithered bias concept as well as the mechanically dithered bias concept.

In the mechanically dithered bias, the bias is delivered to the laser body by the spring, and the mechanical inertia of the body causes the body to oscillate on the spring.

In the Faraday cell dithered bias, the bias is delivered to the laser beam by the magnetic field, and the magnetic field inertia or resistance to change is equivalent to the inertia of the mechanical body.

The driving function for the mechanical embodiment is the torque applied to the body. Such torque may be applied directly between the body and the supporting structure, or it may be delivered through the supporting spring. Such torque may change quickly, but the angular velocity of the laser body changes more slowly due to the intertia of the body and the spring constant of the spring.

The driving function for the Faraday cell embodiment is the voltage applied to the Faraday cell coil. Such voltage may change quickly, but the magnetic field and coil current change more slowly due to the magnetic resistance-inductance time constants of the circuit.

The invention will be desribed in its mechanical embodiment, but the equivalent Faraday cell structure will occasionally be mentioned.

As described generally in U.S. Pat. No. 3,373,650, both apparatus are a device wherein two beams of monochromatic light are generated along a closed loop path in two opposite directions and the frequency difference between the two beams is determined as a measure of rotation thereof. The apparatus to prevent the lock-in of the two beams of light comprises a means of biasing the beams of light at different frequencies; and means causing the bias periodically to reverse.

To minimize the amount of energy required to oscillate or dither to ring laser angular rotation sensor, it is preferable to mount the angular rotation sensor body upon a spring structure and to dither or oscillate the body and spring structure about the sensor axis as the natural frequency of the angular rotation sensor mass the spring structure. The amplitudes of the oscillation or dithering are carefully controlled and monitored to minimize the lock-in effects. Because the dither oscillation angular velocity and displacment relative to a support structure can constantly be monitored and measured, they may be excluded from the output signal of the angular rotation sensor to produce signals that are measures of the angular velocity and displacement of the angular rotation sensor-support structure about the sensor axis of the angular rotation sensor.

It has been found that a constant amplitude dithering of the laser angular rotation sensor about its sensor axis is inadequate totally to eliminate lock-in error. It was first suggested that the superimposing of a random signal upon the amplitude of the dither driving amplifier would be satisfactory. However, it was found that substantial error was produced by the use of such random signal.

One structure for mounting angular rotation sensors is to mount them upon a gimballed system. Typically the sensing axes of the angular rotation sensors are held fixed relative to inertial space or relative to ground coordinates.

Still another mechanization is to attach the angular rotation sensors to the vehicle so that the sensor axes of the angular rotation sensors are aligned with a set of orthogonal axes upon the aircraft. So, too, accelerometers are positioned on the vehicle. A computer continuously transforms the information in vehicle coordinates into desired navigation coordinates. Such a mechanism is called a strapped down mechanization. In a strapped down mechanization, it is not unusual to have shock mounts between the vehicle and the instruments.

Because of the scale factor accuracy and input range of the ring laser angular rotation sensor, it is much better suited for a strapped down system than a spinning rotor gyro. The scale factor accuracy advantage of a ring laser rotation sensor is typically five to ten times more accurate than a spinning rotor gyro.

When more than one ring laser angular rotation sensor is strapped down, it is customary to support the angular rotation sensors upon a platform or mounting structure which is supported by low-pass shock mounts relative to the vehicle. If the natural frequencies of the mechanical mass-spring combinations of more than one ring laser angular rotation sensor connected to the same platform or mounting structure are the same, the oscillation of one mass-spring combination may excite oscillation in another mass-spring combination. The mechanical interaction between the mass-spring combinations of the angular rotation sensors (typically three) on the platform or mounting structure produces complex angular motions which are functions of the sums and differences of each of the angular rotation sensor dither frequencies. If the frequencies of two or more angular rotation sensors are the same or near the other, coning or Scorsby motion can occur about an axis or about all axes of the platform or mounting structure. To minimize such exciting or coupling between the mass-spring combinations, it is customary to select the mass-spring combinations of the angular rotation sensors to have different natural frequencies. Although they may be larger, usually the differences in natural frequencies of the mass-spring combinations of the laser angular rotation sensors are on the order of five to ten hertz. A typical three decibel band width of a ring laser mass-spring system is on the order of five hertz.

In a mechanically dithered system, coning motion of the supporting platform or mounting structure arises because of reaction torque through the support or platform from one mass-spring system to itself or another. The input coning motion produces angular rotation sensor-sensed coning rate. Although coning motion is normally larger when a mass-spring system has a natural frequency which is within the three decibel bandwidth of the natural frequency of another mass-spring system, unacceptable coning errors may exist when the natural frequencies differ by several bandwidths. Note that the coning motions may be induced about any or all axes regardless of the ring laser angular rotation sensor mutual mounting orientations.

In a Faraday cell dithered system, coning motion of the supporting platform or mounting structure arises because of magnetic coupling between the Faraday cells in the various ring lasers. It would, in the prior art, be desirable to separate the dithering frequencies of the plurality (usually three) ring laser rotation sensors so that the bandwidths of the sensors do not overlap.

The following example is preliminary to further explaining coning errors. Suppose a right handed rectangular coordinate system is positioned at the zero meridian on the equator of the earth with its x axis pointing east, its y axis pointing north along the zero meridian, and its z axis vertical.

In the following described motions the z axis is maintained vertical, and the angular rate of the x and y coordinates about the z axis is held to zero.

The coordinate system is moved eastward ninety degrees of longitude. The x axis still points east and the y axis points north along the ninety degree east meridian.

The coordinate system is then moved north ninety degrees of latitude. The x and y axes now both point south. The x axis points along the one hundred and eighty degrees meridian. The y axis points along the 90 degree west meridian.

The coordinate system is then moved south along the zero meridian to its starting point. The x axis then points north along the zero meridian, and the y axis points west.

The apparent change in direction is called the wander angle. Note that the change in orientation is ninety degrees. That is not a coincidence. For any closed vehicle trajectory on a sphere the wander azimuth change equals the ratio of the area enclosed by the trajectory to the area of the sphere. In particular, if an aircraft continually circles in a holding pattern, the wander azimuth angle changes at a constant rate determined by the area enclosed by the holding pattern and the rate at which the pattern trajectories are completed.

The discussion is directed to a system wherein three angular rotation sensors are positioned on a platform or mounting structure with each angular rotation sensor measuring angular velocity about one of the orthogonal coordinate axes, but the discussion is equally valid in a strapped down system wherein the angular velocity coordinates are computed and stored in a computer memory.

Consider a strapped down system. The x,y and z axes are angularly constrained relative to a vehicle. The constraint may be through low pass shock mounts. Further, because of the resiliency of the angular rotation sensor platform or mounting structure the angular rotation sensors may be considered to be attached together by very stiff springs. The dither oscillations of each of the three angular rotation sensors mounted upon the platform delivers some portion of that dither oscillation to the platform thence to the other angular rotation sensors. In the mechanical embodiment, the coupling is mechanical and through the support structure. In the Faraday cell embodiment, the coupling is magnetic.

In an example it is assumed that the angular motions about both the x and y axes are of equal amplitude and sinusoidal, but the sinusoids are ninety degrees out of phase. The x and y axes then each trace out a figure eight motion. The z axis traces out a circle of radius r where r is the amplitude, in radians, of the sinusoids delivered about the x and y axes.

In a Faraday cell embodiment, the axes orientations would be slightly different, but the principle would be the same.

For a numerical example, assume:

The amplitude of the oscillations about the pitch and roll axes are plus or minus 0.01 radian (0.573 degrees). Then the area of the circle is $$dA = (3.14159)(0.01)(0.01) = 0.000314159$$

If the period of the oscillation, dt, is 0.0025 seconds will indicate that the sensed angular rate about such z axis is $$dA/dt = 0.125836 \text{ radians or } 6.68 \text{ degrees per second}$$

even though the average azimuth change is zero.

The above example illustrates pure "coning" in which a body undergoes sinusoidal vibrations about orthogonal axes, and in which the vibrations are ninety degrees out of phase so that a fixed body z axis traces out a cone. For the z axis coning rate to exist, the motions delivered to the x and y axes need not be sinusoidal and the time relation between such signals need not be constant. As in the example, it is only necessary that some axis (referred to here as "z") trace out a closed path on a unit sphere. If the phase relations between the different axes are random, positive areas concel negative areas as in a "random walk", but the angular change will still build up with the square root of time. Note that even if the motion were random, the phase angles would be correlated out of phase causing an average drift in one direction.

In a Faraday cell embodiment, the above example would correspond to the situation wherein the three magnetic fields would be coupled, and sinusoidal vibrations of the magnetic fields are out of phase and couple into the Faraday cell of another ring laser rotation sensor whose sensing axis is differently oriented on the supporting structure (usually orthogonal).

BRIEF DESCRIPTION OF THE INVENTION

The apparatus of the invention is directed to using only a primary dither driving frequency for the mechanical dither. The method and means for controlling the dither driving function provide a solution to the laser beam lock-in problem and also prevent the inter-angular rotation sensor coupling that leads to coning errors.

To facilitate mass production of ring laser rotation sensors, it is desirable to have the mechanical natural frequencies of the mass and spring combinations of the ring laser gyros and their supporting spring combinations substantially equal. Further, in a Faraday cell embodiment, it is desirable to have the magnetic coils and driving apparatus substantially identical and to drive them at the same frequencies. To conserve energy, it is desirable to tune the current in the Faraday coil, and to have identical mass-produced coils and associated capacitors would be preferable.

MINIMIZING LOCK-IN EFFECTS

Mechanically Dithered Embodiment

It is contemplated by this invention to apply a dither driving function torquing frequency that is close to the natural frequency of the mass-spring combination. In a preferred embodiment, the frequency of the applied torque is within the 3 db pass-band of the mass-spring combination.

An angular acceleration, velocity, or displacement sensor between the laser body and its associated support may be used to sense the dither. When angular acceleration is sensed, the signal may be integrated to produce an angular velocity signal and integrated again to produce an angular displacment signal. When angular velocity is sensed, the angular velocity signal may be integrated to produce an angular displacement signal. Similarly, displacement signals may be differentiated to produce velocity and acceleration signals. Velocity signals may be differentiated to produce acceleration signals.

The angular acceleration, velocity and displacement signals are typically sinusoidal, and their peak amplitude is measured for use in this invention. In a digital embodiment of the drive circuit for the mechanically dithered ring laser body, the signal is sampled at timed intervals which are very much shorter than the period of the natural mass-spring oscillation period of the spring-supported ring laser, and the absolute value of the samples are averaged to obtain a measure proportional to the average of the peak amplitude. When the peak amplitude of the parameter, chosen from the class consisting of angular acceleration, velocity or displacement, decays to a predetermined value, a driving torque is applied to the mass-spring combination. When the sum of the added samples increases sufficiently, the driving torque is removed, and the mass-spring combination is allowed to coast or oscillate at its natural frequency while slowly decaying to the predetermined value, whereupon the driving torque is re-applied.

Faraday Cell Dithering Embodiment

In the Faraday cell embodiment, the driving voltage is turned on and off. WIth a tuned circuit, the current in the Faraday coil could be measured, and the driving bias voltage would then be turned on when the current decreases below a predetermined amplitude and turned back on when the current increases above a predetermined amplitude. The dithering current and magnetic field then oscillates up and down, and the lock-in band of each ring laser rotation sensor is reduced.

MINIMIZING CONING EFFECTS

Mechanically Dithered Embodiment

Coning effects occur when the natural frequencies of the three mass-spring combinations, associated with three ring laser angular rotation sensors whose sensor axes are orthogonal, are very close together. Certainly coning effects occur if the natural frequencies are within the 3 db bandwidth of each other, and they occur to a lesser extent if the natural frequencies are within two or three bandwidths of each other.

To avoid coning effects, it is contemplated by this invention to frequency-modulate or phase-modulate the dither driving torque. The driving frequency is preferably servoed to the natural frequency of the mass-spring combination for the mechanically driven dither of ring laser. The amplitude of the modulating signals are such that the driving frequency is preferably held to swing across such driving frequency within the three decibel bandwidth of the natural frequency of the associated mass-spring structures.

The modulating signals may be sinusoidal, trapezoidal, steps, pulses, square wave, saw-tooth, maximal length binary sequence, or other arbitrary, preferably deterministic, functions of time.

One preferable function is generated by a maximal length shift register generator. Such a shift register having fifteen bits produces about 32000 numeral combinations. If, for example, sixteen numerals were chosen per second as modulating amplitudes, it would take 33 and ⅔ minutes to use all 32000 numerals. It has been found, however, that all bit positions of the registers need not be used. For example, five bit positions, selected from the fifteen bit register will still produce a sequence of numerals which will not repeat for a time that is long compared to the time constants of the instruments and of the system. That number, based on the five chosen bits, is used as the modulating signal.

Faraday Cell Dithered Embodiment

In a Faraday cell dithered embodiment, it is also desirable to avoid coning effects caused by magnetic coupling between the three like-frequency ring laser rotation sensors. Each of the bias driving voltages may be frequency or phase modulated. The driving bias voltage is preferably frequency modulated across the natural frequency of the tuned Faraday coil.

It is therefore an object of the invention to minimize lock-in of ring laser angular rotation sensors.

It is also an object of the invention to minimize coning of a supporting structure which supports a plurality of ring laser angular rotation sensors.

Other objects will become apparent from the following description, taken together with the accompanying drawings.

DETAILED DESCRIPTION OF THE INVENTION

Figure 1:
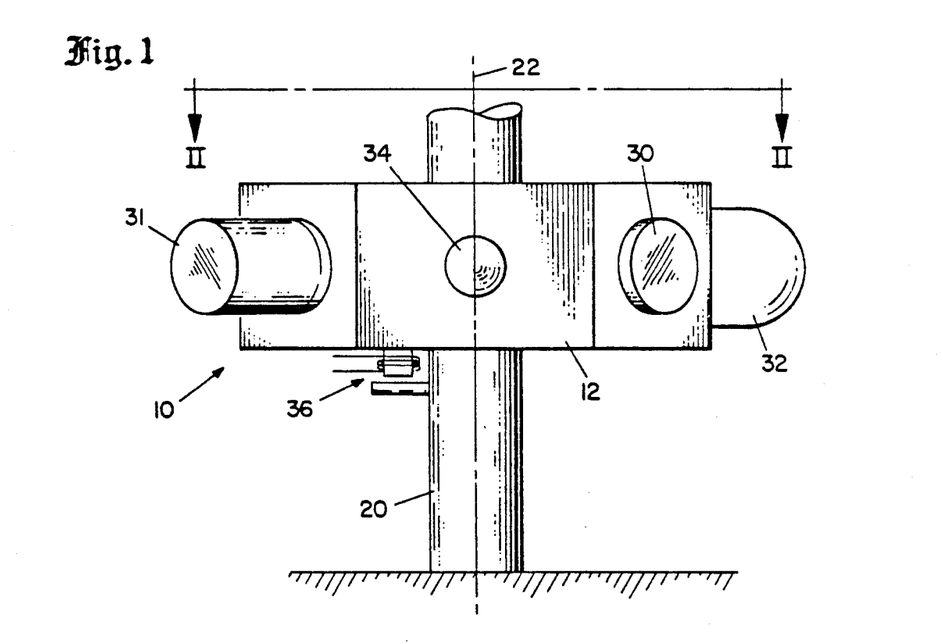
FIG. 1 is a side schematic view of a ring laser angular rotation sensor mounted upon a supporting structure.
Figure 2:
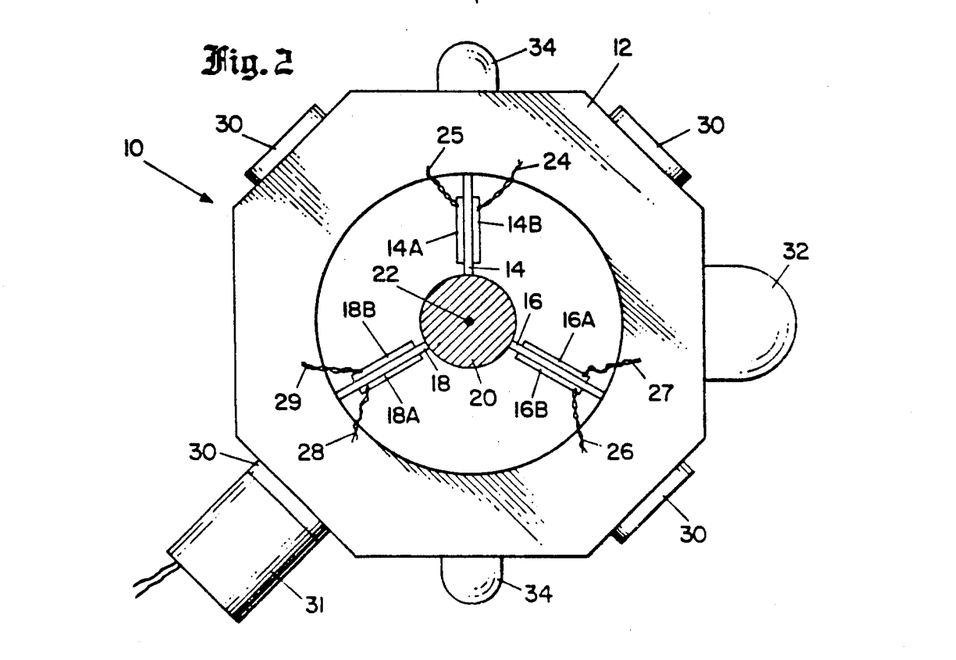
FIG. 2 is a view of the ring laser angular rotation sensor taken at 2—2 in FIG. 1.

FIGS. 1 and 2 show a side and plan view of a typical ring laser angular rotation sensor 10. The figures are schematic in nature in that many structural details are missing.

The laser body 12 is supported by cantilevered springs 14, 16, 18 from a support 20 for vibration or dither about the sensor axis 22. The springs are preferably linear springs, but they may be non-linear. Upon each spring 14, 16, 18 are shown a pair of piezoelectric wafers 14A, 14B, 16A, 16B, 18A, 18B. The wafers are typically cemented or glued to the opposite surfaces of the springs. They are connected through conductors 24, 25, 26, 27, 28, 29 to be driven by torquing voltages to cause the springs 14, 16, 18 to flex to deliver a torque to the body 12 relative to the support 20. Alternatively, a torque may be applied directly between the laser body 12 and support 20 by other known torquing means (not shown).

Typical ring laser angular rotation sensor spring structures are taught and shown, for example, in the following patents which are assigned to Litton Systems Inc.

U.S. Pat. No. 4,321,557 which issued Mar. 23, 1981 to Fred McNair;

U.S. Pat. No. 4,312,174 which issued Feb. 2, 1982 to Thomas Wing and Lloyd M. Germain;

U.S. Pat. No. 4,309,107 which issued Jan. 5, 1982 to Fred McNair

U.S. Pat. No. 4,115,004 which issued Sept. 19, 1978 to Thomas J. Hutchings and Virgil E. Sanders.

Corner mirrors 30 guide laser light around a closed path in channels (not shown) within the body 12. Typically, one of the mirrors is partly transmissive, and a photosensor 31 collects the light to generate a signal whose frequency is a measure of the angular velocity of the laser 10 about its sensor axis 22. Within the channels (not shown) is a laser gas such as a helium-neon mixture which is excited by a voltage from a voltage source (not shown) that is connected to the cathode 32 and the anodes 34.

An angular pickoff, such as a magnetic rate sensor 36, produces signals that are a measure of the instantaneous angular velocity of the block 12 relative to the support 20. The sensor 36 may be any other kind of angular rate sensor, angular acceleration sensor or angular displacement sensor that is known in the art and capable of creating a signal of the angular acceleration, velocity or displacment between the body 12 and the support 20. A magnetic sensor is exemplary.

Typically the support 20 may be a stabilized platform which maintains its orientation relative to inertial space or relative to the earth's surface. It may also be a strapped down system as shown schematically in FIG. 5.

The essence of a ring laser angular rate sensor is that two laser light waves, circulating in opposite directions around the same closed path, from mirror to mirror 30, undergo non-reciprocal phase shifts when the path is rotated. Since the path is a laser resonant cavity, the frequency of each wave is very sharply determined, and the frequency shifts are detectable by optically interfering the two waves at a photoelectric detector or photosensor 31. The two frequencies heterodyne at a common photosensor 31, giving rise to a beat signal whose frequency is directly proportional to the angular rotation rate of the angular rotation sensor 20 about its sensor axis 22. When the angular rotation rate of a simple, unbiased ring laser is reduced to some minimum value, the frequency split between the clockwise and counterclockwise modes of oppositely directed light waves decreases so that the separate oscillations are no longer sustained. The modes of oppositely directed light lock at the same frequency. The phenomenon of frequency locking is called, "lock-in". The lock-in is caused primarily by the backscattered radiation which is created as the light waves are reflected from the various mirrors within the closed path which forms the ring laser body.

In the mechanical embodiment, to minimize the errors due to lock-in, the ring laser angular rotation sensor body 12 is oscillated or dithered relative to the support or vehicle 20. The measured output of the photosensor 31 contains a component of the angular rate between the body 12 and the support 20. The signal from the sensor 36 is then subtracted from the signal of the photosensor 31 to produce a signal which is a true measure of the angular velocity of the support or vehicle 20 about the sensor axis 22 of the ring laser angular rotation sensor 10.

Typically the dither vibration is sinusoidal, and, in the prior art, a power amplifier continuously delivers enough sinusoidal energy to the piezoelectric or other torquers to maintain the oscillations. The prior art signal delivered to the piezoelectric or other torquers might be sinusoidal or square wave with, perhaps, a secondary dither waveform superimposed thereon which produced an amplitude envelope modulation. Preferably the mass of the body 12 and the spring constant of the springs 14, 16, 18 are very high Q. That is to say, their bandwidth is very narrow. When torques are delivered through the springs, as with the shown piezoelectric torquers 14AB, 16AB, 18AB, the dithered bias delivered to the body 12 is substantially sinusoidal even when the applied torque is not sinusoidal.

Figure 10:
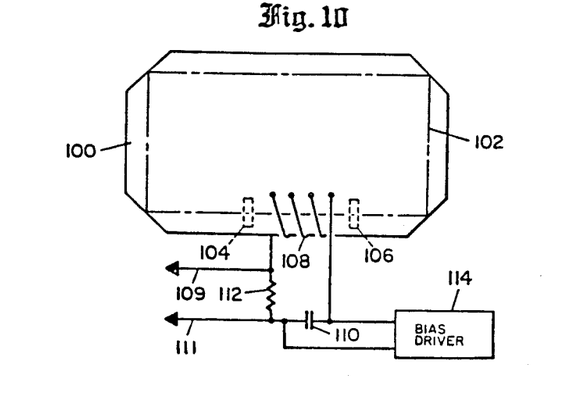
FIG. 10 is a schematic model of a ring laser gyro with a Faraday cell dither mechanism.

The Faraday cell dithering concept shown in FIG. 10 uses a parallel coil-capacitance so-called "tank" circuit which has a natural frequency. It is preferably a high Q circuit. The driving function for the bias current need not be sinusoidal.

In FIG. 10, a ring laser body is shown at 100. A coil 108 is shown surrounding a portion of the ring laser path 102. Quarter wave plates 104 and 106 are associated with the Faraday section within the coil 108. The capacitance 110 is shown connected in parallel with the coil 108 to form a parallel tuned or tank circuit. The resistor 112 has a very small resistance, and it is used as the sensing resistor to produce a signal across the conductors 109,111 which is proportional to the current flow through the coil 108. A bias driver 114 drives the current flow and hence the magnetic field produced within the Faraday section by the current flow.

Although the embodiment shown in FIG. 10 shows a parallel tuned circuit, a series tuned circuit could be used instead of a voltage driver. The appropriate driver is called a "Bias Driver" 114.

Figure 3:
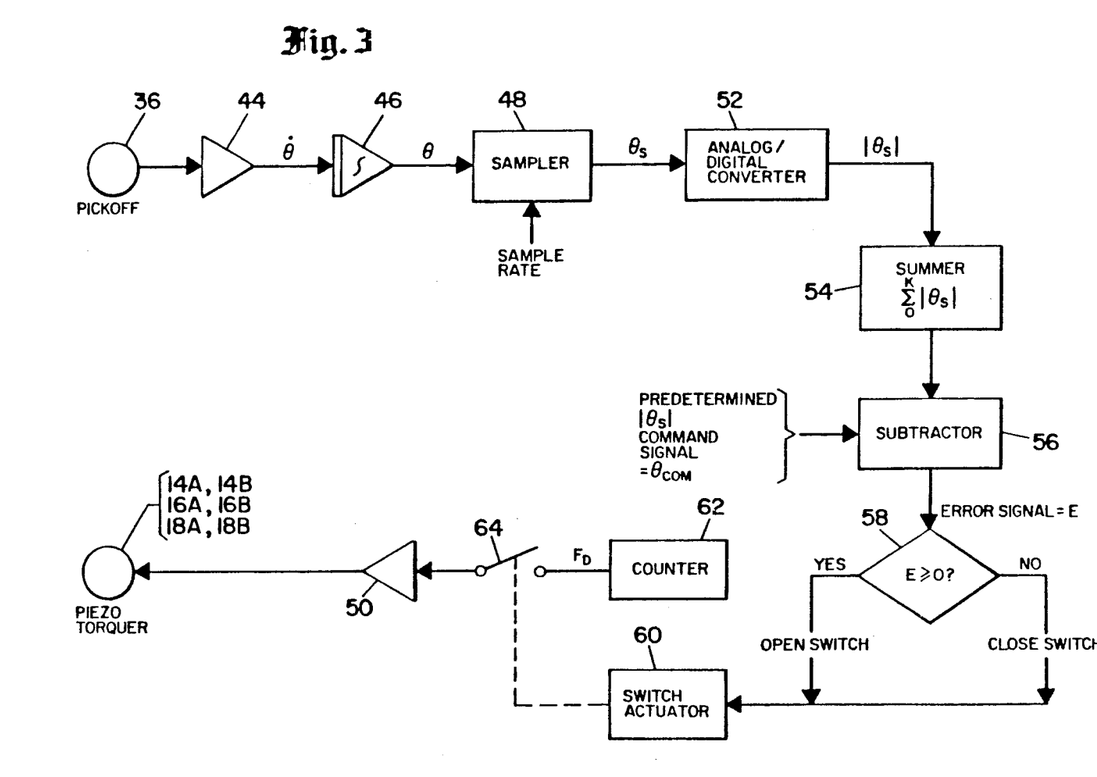
FIG. 3 is a block diagram of a dither amplitude controller of this invention using digital technology.
Figure 4:
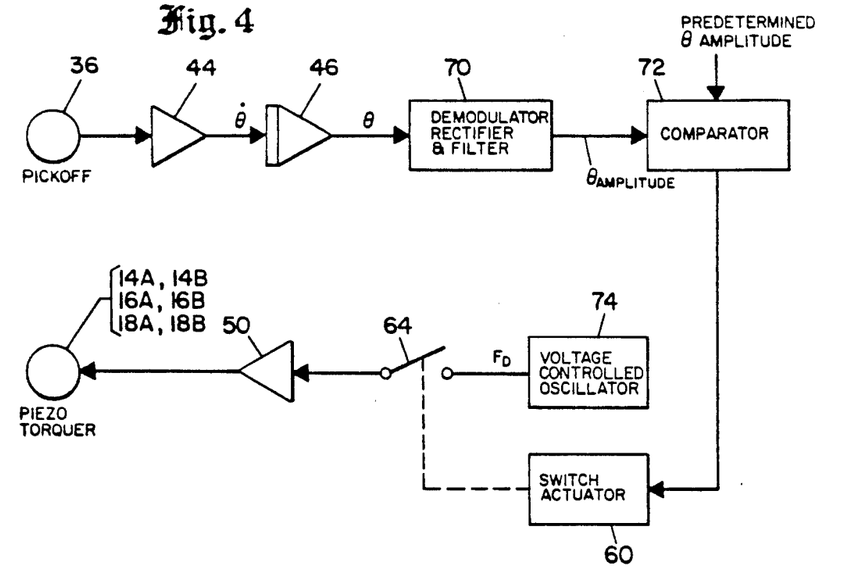
FIG. 4 is a block diagram of a dither amplitude controller of this invention using analog technology.

In FIGS. 3 and 4 are shown apparatus for intermittently applying a signal from the power amplifier 50 to the torquers 14AB, 16AB, 18AB or to the Bias Driver 114. FIG. 3 uses digital technology, and FIG. 4 uses analog technology.

The FIGS. 3, 4, 6 and 7 show one means 37 for producing signals which are measures of the angular velocity and displacement between the laser body 12 and the support 20. The pickoff 36 produces a measure of angular velocity between the body 12 and the support 20. That signal may be measured at the output of the isolation amplifier 44. The angular velocity signal is integrated by the integrator 46 to produce a signal which is a measure of the angular displacement between the body 12 and the support 20.

Figure 8:
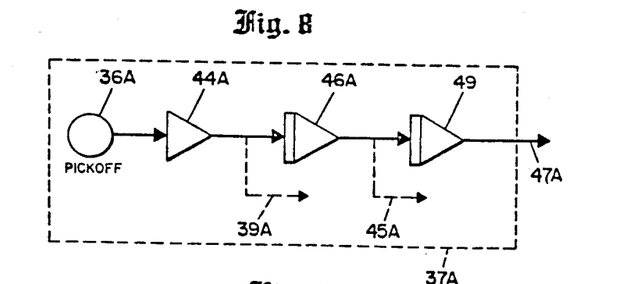
FIG. 8 is a first alternative embodiment of a pickoff circuit used with the invention.

FIG. 8 shows a means 37A for producing signals which are measures of the angular acceleration, velocity and displacement between the laser body 12 and the support 20. The pickoff 36A produces a signal which is a measure of angular acceleration between the body 12 and the support 20. That signal may be measured at the output 39A of the isolation amplifier 44A. The angular acceleration signal is integrated by the integrator 46A to produce a signal at its output 45A which is a measure of the angular velocity between the body 12 and the support 20. The angular velocity signal is integrated in the integrator 49 to produce a signal at its output 47A which is a measure of the angular displacement between the body 12 and the support 20.

Figure 9:
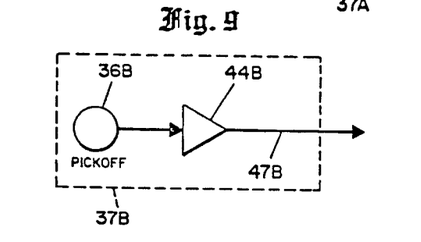
FIG. 9 is a second alternative embodiment of a pickoff circuit used with the invention.

FIG. 9 shows a means 37B for producing a signal which is a measure of the angular displacement between the laser body 12 and the support 20. The pickoff 36B produces a signal which is a measure of angular displacement between the body and the support 20. That signal may be measured at the output 47B of the isolation amplifier 44B.

The apparatus of FIGS. 3 and 4 turn the bias drivers on and off in response to the amplitude of the dither. In the mechanical embodiment, the torque drivers 14AB, 16AB, 18Ab are turned on and off in response to the amplitude of the dither displacement. In the Faraday cell embodiment of FIG. 10, the Bias Driver 114 is turned on and off in response to the amplitude of the biasing current in the coil 108 as evidenced by the voltage across conductors 109, 111.

It is to be stressed that, the apparatus of FIGS. 3 and 4, in other mechanical embodiments of the invention, turn the bias drivers on and off in response to the amplitude of the dither angular velocity or angular acceleration. The angular velocity signals may, for example, be obtained at the output of the amplifier 44 of at the output 45A of the integrator 46A. The angular acceleration signals may, for example, be obtained at the output 39A of the amplifier 44A.

The Faraday cell embodiment may have the bias driver 114 switched in response to the amplitude of time derivatives of the voltage between conductors 109 and 111. Such time derivative signals may be obtained by differentiators (not shown) of the types well known in the art.

In the apparatus of FIG. 3, the sampler 48 samples the displacement signal at the output of the integrator 46 at a sample rate which is substantially greater than the natural frequency of the mass-spring 12,13,16,18. In the Faraday cell embodiment, the sampling would be at a sample rate which is substantially greater than the resonance frequency of the capacitor 110 and the inductor 108. Typically the sampling rate may on the order of five or more times that natural frequency. After a predetermined number of samples, usually several cycles of the dither oscillation, the sampled absolute values are summed in the summer 54 to produce a signal which is an estimate of the peak value of the sampled variable (here angular displacement-but see above for other sampled values for other embodiments of the invention). For example, the dither frequency may be 400 Hz, the sampling frequency may be 2048 samples per second, and the samples may be summed over 32 samples which is slightly over six cycles of the natural frequency of the body 12 and its supporting springs 14,16,18. Because the sampling and the natural frequency are not in synchronism, the total would vary slightly even if the oscillations of the body 12 were at a constant amplitude. The sum value at the output of the summer 54 is a measure of the average value of the absolute value of the sampled sinusoidal signals. That summed value is delivered to the subtractor 56, and the summed value is subtracted from a predetermined constant command signal, the difference signal being designated the error signal, E. A logical circuit 58 delivers, to the switch actuator 60, a "close switch" command when E is less than zero and an "open switch" command when E is greater or equal to zero.

The counter 62 generates a drive signal for the piezo or other torquers 14AB, 16AB, 18AB, through the power amplifier 50 whenever the switch 64 is clsoed by the switch actuator 60.

In the Faraday cell embodiment, the signal from counter 62 is delivered to the Bias Driver 114.

In the analog circuit of FIG. 4, the sinusoidal signal at the output of integrator 46 is demodulated and filtered by the demodulator and filter 70 to generate a signal that is proportional to the amplitude of the envelope of the dither signal at the output of the integrator 46.

Again it is to be stressed that angular velocity or acceleration signals could be received in other mechanical embodiments by the demodulator and filter 70.

In the Faraday cell embodiment, the current could be sampled on the conductors 109,111. Alternatively the signal on conductors 109,111 could be differentiated by means not shown to produce signals that are delivered to the demodulator and filter 70.

The amplitude signal at the output of the demodulator and filter 70 is then compared by the signal comparator 72 to a predetermined amplitude signal, and the switch 60 is closed and opened in response to the output signal of the comparator. When the output of the demodulator and filter 70 becomes greater than the predetermined amplitude value, the output of the comparator 72 is set to cause the actuator 60 to open the switch 64. When the output of the demodulator and filter 70 becomes smaller than the predetermined amplitude value, the output of the comparator 72 is set to cause the actuator 60 to cloase the switch 64. When the switch 64 is closed, the output of an oscillator, such as the voltage controlled oscillator 74, may be connected through a power amplifier 50, in the mechanical embodiments to drive the piezoelectric torquers 14AB,16Ab,18AB.

In the Faraday cell embodiment, the output of the power amplifier 50 drives the Bias Driver 114.

In operation, when the amplitude of the dither displacement, velocity or acceleration (the mechanical embodiment), or the amplitude of the current in coil 108 or its derivatives (in the Faraday cell embodiment), as shown either by the amplitude at the output of the summer 54 or by the amplitude of the envelope voltage at the output of the demodulator 70, the driving power amplifier 50 delivers energy. When the amplitude of the sampled dither variable is again calculated by the subtractor 56, or by the comparator 72, if such amplitude is above a predetermined value, the driving amplifier 50 ceases to deliver energy to the torquers.

Note that in the embodiment of FIG. 3 only one predetermined value need be used for the turning on and turning off of the amplifier 50. In the analog embodiment of FIG. 4, because the signals are continually sampled, two predetermined values need specification, one for turning on the amplifier 50 and one for turning it off.

Figure 5:
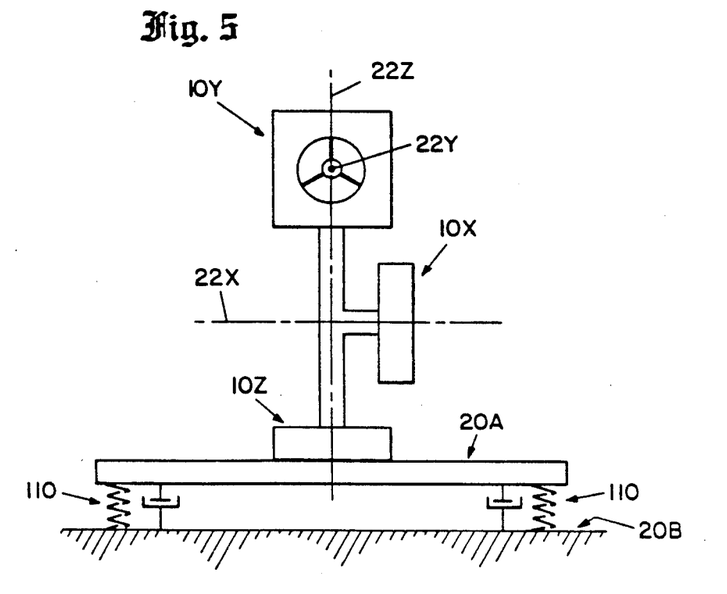
FIG. 5 is a stick-model of three ring laser angular rotation sensors having orthogonal sensor axes and mounted upon a shock-mounted platform relative to a vehicle or support.

Consider the schematic structure of FIG. 5 which shows three ring laser angular rotation sensors 10X, 10Y and 10Z mounted with their sensor axes 22X, 22Y and 22Z orthogonal.

In the mechanical embodiment, the angular rotation sensors are each suspended for small angular dither rotations upon spring sets about their sensor axes ralative to the platform 20A.

In the Farady cell embodiment, such angular rotation sensors would merely be attached to the platform 20A.

The platform 20A may be a gimballed or ungimballed platform, and it may optionally be suspended upon shock mounts and dampers, shown generally at 110, relative to a supporting structure or vehicle. Alternatively, platform 20A may be rigidly attached to structure or vehicle 20B. Note that the term "rigid" is relative, for all materials are to some extent elastic.

Each of the angular rotation sensors 10X, 10Y and 10Z is driven by an identical circuit.

Figures 6, 7:
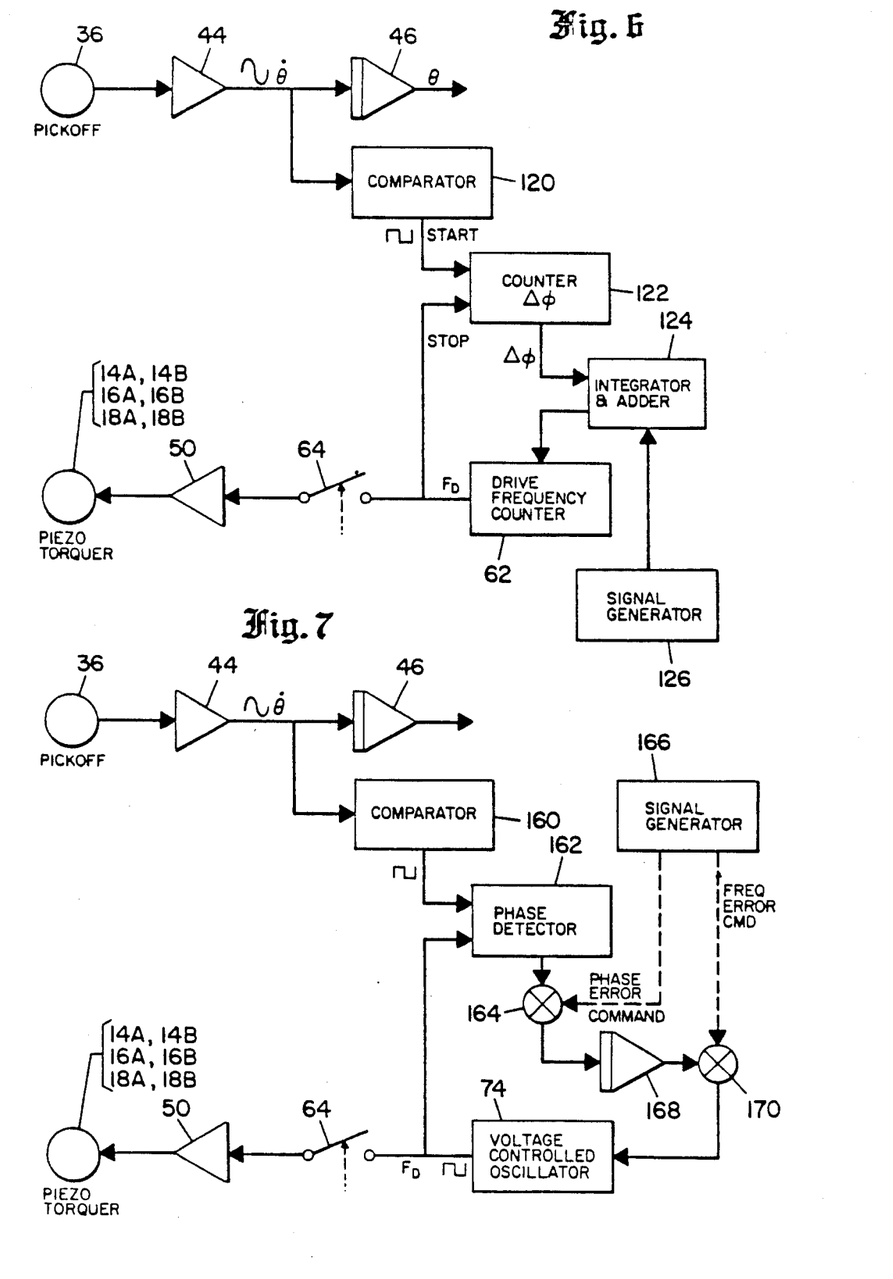
FIG. 6 is a block diagram of a dither-drive frequency or phase controller according to the invention, using digital technology.
FIG. 7 is a block diagram of a dither-drive frequency or phase controller according to the invention, using analog technology.

In the mechanical embodiment, the natural frequencies of the mass-spring systems of the three angular rotation sensors may be substantially different, but the circuit of FIGS. 6 and 7 are conceived as part of this invention for the situation wherein such natural frequencies are identical or substantially identical. Note that the mass-spring systems are not heavily damped, whereby they have a very sharp resonant peak. Dither oscillation of one angular rotation sensor at its natural frequency couples energy through the platform 20A, and possibly through 20B, to the other angular rotation sensors. The closer their natural frequencies, the more they are affected by such coupled energy. In many situations the angular rotation sensors with near natural frequencies interact to such an extent that both angular rotation sensors are caused to oscillate at the same frequency with a fixed phase relation. The oscillation at the same frequency with a fixed phase relation can produce coning motions induced into the third angular rotation sensor at the common frequency of the two angular rotation sensors.

In the Faraday cell embodiment, interaction between the magnetic fields of the angular rotation sensors 100 makes the outputs of the rotation sensors 100 appear to be coning, and the associated computer will produce signals as if mechanical coning were actually happening. In the following description of coning motion, what is meant, insofar as the Faraday cell embodiment is concerned, is the equivalent of such motion within the navigation computer.

Such high frequency coning motion produces coning rates which cannot adequately be compensated by the associated computer. The computer used with a typical guidance system would not be sufficiently accurate or speedy to compensate fully for these high frequency coning interactions. Further, quantization errors and/or resolution errors in the ring laser output would be prohibitively high so that the angular rotation sensor is not adequately sensitive to cause the resulting coning rates computational errors to be insignificant. Even if the angular rotation sensors were sufficiently accurate and speedy, it would require considerable extra computer capability to keep track of the coning errors and to subtract out such errors.

Coning occurs when the driving frequencies, without phase slip or shift, remain substantially constant. The apparatus of FIGS. 6 and 7 cause the drive frequency delivered to the piezoelectric torquers 14AB, 16AB, and 18AB or the Bias Driver 114 to be frequency or phase modulated. By reference to the part numbers, it becomes apparent how the circuits of FIGS. 6 and 7 fit with the circuits of FIGS. 3, 4 and 8, respectively. FIG. 6 uses digital technology, and FIG. 7 uses analog technology.

Before proceeding further, it is important to emphasize that because the signals are sinusoidal, the relation between the angular acceleration, velocity and displacement is merely a phase shift. That is, if the displacement is a sine signal, the velocity is a cosine signal, and the acceleration is a negative sine signal—all at the same frequency. The amplitudes, of course, will be different. Similarly, if the current in the coil 108 is a sine function, its derivatives will be a cosine and a negative sine function. Consequently, the various derivative and integral signals may be approximated by a known phase shaft of ninety degrees in one direction or the other and by a scaling of the amplitudes of the sinusoidal signals. It is also apparent that although, for example, the output signal at 45 is used in FIGS. 6 and 7, that other signals of elements 37, 37A and 37B could be used instead with corresponding phase shifts and scaling.

In FIG. 6, The comparator 120 changes the sinusoidal angular velocity signal at the output of buffer amplifier 44 into a square wave signal. When the angular velocity is positive, the comparator 120 delivers a constant plus voltage. When the angular velocity is negative, the comparator 120 delivers a zero voltage. The output of the comparator 120 is connected to the "start" terminal of the counter 122. The output of the drive frequency counter 62 is connected to the "stop" terminal of the counter 122. One important purpose of the driver frequency control of FIG. 6 is to ensure that the drive frequency counter 62 operates around the resonant frequency of the dither spring mechanism. When the two frequencies are synchronized, the counter 122 has an indicated output of zero. The output of the counter 122 represents the difference in phase between the dither drive and the angular rotation sensor relative position. The output of the counter 122 is connected through an adder 124 to control the frequency of the drive frequency counter 62. In the absence of the signal generator 126, the signal delivered by the frequency counter 62 would be servoed to the frequency of oscillation of the laser body 12 relative to the structure 20 or, alternatively in the Faraday cell embodiment, to the frequency of the current in the coil 108.

Modulating signals are delivered to the adder 124 from the signal generator 126. The modulating signals are either frequency modulating or phase modulating signals. Both are shown for convenience. The command signals from the generator 126 cause the counter 62 to increase or decrease its frequency. The amount of frequency swing is preferably within the pass band of the mass-spring system of the laser angular rotation sensor or within of the coil 108 and capacitor 110. Although inefficient, energy outside of the pass band if effective for perhaps two or three 3-db bandwidths. The driver frequency generator 62 never stops, and the counter 122 merely adjusts the phase. With the frequency within the nominal three decibel bandwidth, the on/off control of the counter 122 does not materially affect the frequency control.

An alternate embodiment (not shown) for controlling the counter 62 to follow the resonant frequency of the dither spring would be identical to FIG. 6 except that the stop signal would not be connected to the counter 122. The counter 122 would periodically count its input signals only when the switch 64 is open and over a predetermined period of time and deliver a number to the integrator and adder 124. That number would be the resonance frequency of the dither spring-mass combinations. A signal from the comparator 120 would be delivered to the element 124 to synchronize the phase shift to prevent its shifting the phase of the counter 62 an excessive amount to cause the drive signal to attentuate the dither rather than augmenting it. The secondary signal from generator 126 is delivered as in the mechanization of FIG. 6.

The variation in frequency of the driving signal prevents the ring laser triad 10X, 10Y and 10Z from completing the coning in a fixed rotation direction.

The signal from the signal generator 126 may be of many deterministic wave shapes. Typical deterministic wave shapes are sinusoidal, trapezoidal, saw-tooth, steps, pulses and maximal length binary sequences. By deterministic is meant that the wave shape is completely determined and predictable.

In particular it is expedient to use part of a maximal length binary sequence, defined herein as a "partial maximal length binary sequence". A maximal length binary sequence is generated by a maximal length shift register. For example, a shift register having fifteen bits produces 32000 numeral combinations. The entire maximal length binary sequence could be used to produce a modulation signal, but choosing of less than the full shift register produces a partial maximal length binary sequence which represents a number which is added to or subtracted from the modulating signal. Signal generator 126 typically creates a partial length sequence, with a very slow clock rate. For example, a clock rate of sixteen per second in a fifteen bit register, with only five of the fifteen bit positions of the register being used to generate the partial maximal length binary sequence would be satisfactory.

The analog circuit is shown in FIG. 7. The pickoff 35 delivers an angular velocity signal through the buffer amplifier 44 to a comparator 160 which produces a square wave signal at the same frequency as the angular velocity frequency. As mentioned above, the signal delivered to the comparator 160 could, alternatively, be integrals or differentials of the velocity signal.

In the Faraday cell embodiment, signals from conductors 109, 111 or integrals or differentials thereof are delivered to the comparator 160.

The oscillator 74, such as a voltage controlled oscillator, produces a driving signal which is delivered through the switch 64 and the power amplifier 50 to the piezoelectric torquers 14AB, 16AB, and 18AB or to the Bias Driver 114. The output of the oscillator 74 is also delivered to the phase detector 162 which produces a difference signal that is a measure of the phase difference between the signal at the input to the comparator 160 and the signal at the output of the oscillator 74. By a phase difference is meant the phase difference between the fundamental sinusoidal components of the two input signals to the phase detector 162. The output of the phase detector 162 is integrated by the integrator 168 to produce a control voltage for the voltage controlled oscillator 74 to cause its frequency to follow the natural frequency of the body 12 or of the coil 108. Two signals are shown produced by the signal generator 166. A signal may be added into the input of the integrator 168 at 164 for phase modulation or, alternatively, into the output of the integrator 168 and 170 to modulate the frequency of the oscillator 74. The modulating signals are either frequency modulating or phase modulating signals. Both are shown for convenience. The amount of frequency swing is preferably within the pass band of the mass-spring system of the laser angular rotation sensor or, alternatively, of the coil 108 and condenser 110. Delivery of energy outside of the pass band is inefficient. It is, however, effective outside of the pass band for perhaps two or three 3-db bandwidths.

In the mechanical embodiment the variation in frequency of the driving signal prevents the ring laser triad 10a, 10b and 10c from completing the coning in one direction. In the Faraday cell embodiment it prevents the generation of a signal within the associated computer that looks as if the triad were mechanically coning.

The signal from the signal generator 166 may be of any deterministic wave shape. Typical deterministic wave shapes are sinusoidal, trapezoidal, saw-tooth a maximal length binary sequence, and a partial maximal length binary sequence. By deterministic is meant that the wave shape is completely determined and predictable.

Thus, the apparatus of the invention, by causing the dither amplitude to increase and decrease, eliminates problems arising from lock-in of the counter-propagating laser beams in the ring laser. By frequency or phase modulating the dither driving signal, with three angular rotation sensors orthogonally mounted, coning of the angular rotation sensor assembly is avoided.

Although the invention has been described in detail above, it is not intended that the invention shall be limited by that description, but only by that description taken together with the accompanying claims.

We claim:

1. In combination:
an angular rotation sensor support;
a plurality of ring laser angular rotation sensors each having a body with a sensor axis;
an equal plurality of spring means, one for each said angular rotation sensor, for resiliently supporting said angular rotation sensor bodies for limited oscillation about their respective said sensor axes relative to said angular rotation sensor support, the natural mechanical frequencies of said plurality, of the mass of each said body and the spring rate of its spring means, being sufficiently close to produce mechanical coupling of said oscillations through said angular rotation sensor support;
an equal plurality of torquer means for applying torques between said angular rotation sensor support and said angular rotation sensor bodies, respectively;
an equal plurality of driving means for driving said torquer means at substantially said natural frequencies;
a plurality of frequency modulating means, one for each said driving means for frequency modulating the frequency of said driving means with a predetermined periodic step function around said natural frequency of its said respective body and spring means; and
said ring laser angular rotation sensors being positioned with their sensor axes in predetermined orientation, and the period of said periodic function being longer than the longest time constant of any one of said ring laser angular rotation sensors.

2. Apparatus as recited in claim 1 in which
said torquer means are electrically energized torquer means; and
said driving means are electrical driving means.

3. In combination:
an angular rotation sensor support;
a plurality of ring laser angular rotation sensors each having a body with a sensor axis;
an equal plurality of spring means, one for each said angular rotation sensor for resiliently supporting said angular rotation sensor bodies for limited oscillation about their respective said sensor axes relative to said angular rotation sensor support, the natural mechanical frequencies of said plurality, of the mass of each said body and the spring rate of its spring means, being sufficiently close to produce mechanical coupling of said oscillations through said angular rotation sensor support;
an equal plurality of torquer means for applying torques between said angular rotation sensor support and said angular rotation sensor bodies, respectively;
an equal plurality of driving means for driving each said torquer means at substantially its said natural frequency; and
a plurality of phase modulating means, one for each said driving means, for phase modulating the frequency of said driving means with a predetermined periodic function around said natural frequency of its said respective body and spring means; and
said ring laser angular rotation sensors being positioned with their sensor axes in predetermined orientation, and the period of said periodic function being longer than the longest time constant of any one of said ring laser angular rotation sensors.

4. Apparatus as recited in claim 3 in which
said torquer means are electrically energized torquer means; and
said driving means are electrical driving means.

5. In combination:
three ring laser angular rotation sensors mounted upon a resilient platform with their sensor axes substantially orthogonal;
means for dithering said ring laser angular rotation sensors; and
means for frequency modulating and controllably off-setting the frequencies of said dithering of said ring laser angular rotation sensors from each other.

6. Apparatus as recited in claim 5 in which
said means for dithering are electrical means for dithering; and
said means for off-setting the frequencies of dithering are electrical means.

7. In combination:
three ring laser angular rotation sensors mounted upon a resilient structure with their sensor axes substantially orthogonal;
means for dithering said ring laser angular rotation sensors;
means for phase modulating and controllably off-setting the phases of said dithering of said ring laser angular rotation sensors from each other.

8. Apparatus as recited in claim 7 in which said means for dithering are electrical means for dithering; and
said means for off-setting the phases of dithering are electrical means.

9. In a ring laser angular rotation sensor combination,
three ring laser angular rotation sensors mounted upon a resilient platform with their sensor axes substantially orthogonal;

means for dithering said ring laser angular rotation sensors; the improvement comprising:

means for off-setting the frequencies of said dithering of said ring laser angular rotation sensors predetermined frequencies from each other, but each within the dither resonance frequency band of its respective said sensor.

10. In a ring laser angular rotation sensor combination, three ring laser angular rotation sensors mounted upon a resilient structure with their sensor axes substantially orthogonal;

means for dithering said ring laser angular rotation sensors; the improvement comprising:

means for off-setting the phases of said dithering of said angular rotation sensors predetermined phases from each other, but each within the dither resonance frequency band of its respective said sensor.

11. The method of dithering a plurality of ring laser bodies, each spring-supported for oscillatory rotation about difference predetermined axes relative to a resilient supporting structure, the natural frequencies of mechanical oscillation of said spring-supported laser bodies being substantially the same, comprising:

applying oscillatory torques about said axes between said bodies and said structure, the frequencies of oscillation of each of said torques being frequency modulated across the common natural frequency of oscillations of said spring-supported ring laser bodies and being controlled to be offset in frequency from each other.

12. The method of dithering a plurality of ring laser bodies, each spring-supported for oscillatory rotation about different predetermined axes relative to a resilient supporting structure, the natural frequencies of mechanical oscillation of said spring-supported laser bodies being substantially the same, comprising:

applying oscillatory torques about said axes between said bodies and said structure, each said torque being phase modulated across the said common natural frequency of oscillations of said spring-supported ring laser bodies and being controlled to be offset in phase from each other.

* * * * *